(12) United States Patent
Hofstetter et al.

(10) Patent No.: US 9,186,666 B2
(45) Date of Patent: Nov. 17, 2015

(54) METERING DEVICE AND METERING METHOD

(75) Inventors: Meinrad Hofstetter, Felsberg (CH); Vinzenz Kirste, Bonaduz (CH)

(73) Assignee: HAMILTON BONADUZ AG, Bonaduz (CH)

( * ) Notice: Subject to any disclaimer, the term of this patent is extended or adjusted under 35 U.S.C. 154(b) by 162 days.

(21) Appl. No.: 13/520,635

(22) PCT Filed: Jan. 5, 2011

(86) PCT No.: PCT/EP2011/050105
§ 371 (c)(1),
(2), (4) Date: Sep. 18, 2012

(87) PCT Pub. No.: WO2011/083125
PCT Pub. Date: Jul. 14, 2011

(65) Prior Publication Data
US 2013/0001242 A1  Jan. 3, 2013

(30) Foreign Application Priority Data
Jan. 5, 2010 (DE) .......................... 10 2010 000 690

(51) Int. Cl.
*B65D 88/54* (2006.01)
*B01L 3/02* (2006.01)
(Continued)

(52) U.S. Cl.
CPC .............. *B01L 3/0217* (2013.01); *B01L 3/0237* (2013.01); *F04B 7/0015* (2013.01); *F04B 13/00* (2013.01); *F04B 17/044* (2013.01); *G01F 25/0046* (2013.01); *B01L 2400/043* (2013.01)

(58) Field of Classification Search
CPC ............ B01L 2400/043; B01L 3/0217; B01L 3/0273; F04B 13/00; F04B 17/044; F04B 7/0015
USPC ......................................... 222/71, 55–57, 333
See application file for complete search history.

(56) References Cited

U.S. PATENT DOCUMENTS 4,541,787 A * 9/1985 DeLong ........................ 417/417
4,667,853 A   5/1987 Krüger
(Continued)

FOREIGN PATENT DOCUMENTS

DE        25 02 436 A1     7/1976
DE        34 09 142 A1     9/1985
(Continued)

OTHER PUBLICATIONS

Japanese Office Action issued for Japanese patent application No. 2012-547507 dated Aug. 4, 2014. 6 pages.
(Continued)

*Primary Examiner* — Lien Ngo
(74) *Attorney, Agent, or Firm* — Rothwell, Figg, Ernst & Manbeck, P.C.

(57) ABSTRACT

The invention relates to a metering device (10; 10*a*; 10*b*) comprising a guide tube (20; 20*a*; 20*b*), a piston (24; 24*a*; 24*b*) inserted displaceably in the guide tube (20; 20*a*; 20*b*), an actuating assembly (40; 40*a*; 42) for exerting a force on the piston (24; 24*a*; 24*b*) in order to displace the piston (24; 24*a*; 24*b*) in the guide tube (20; 20*a*; 20*b*), and a chamber (28, 30) for receiving a medium to be metered (34), said medium to be metered (34) can be aspirated or dispensed according to a displacement of the piston (24; 24*a*; 24*b*), the actuating assembly (40; 40*a*; 42) being equipped for a magnetic interaction with the piston (24; 24*a*; 24*b*).

24 Claims, 6 Drawing Sheets

Figure 1:
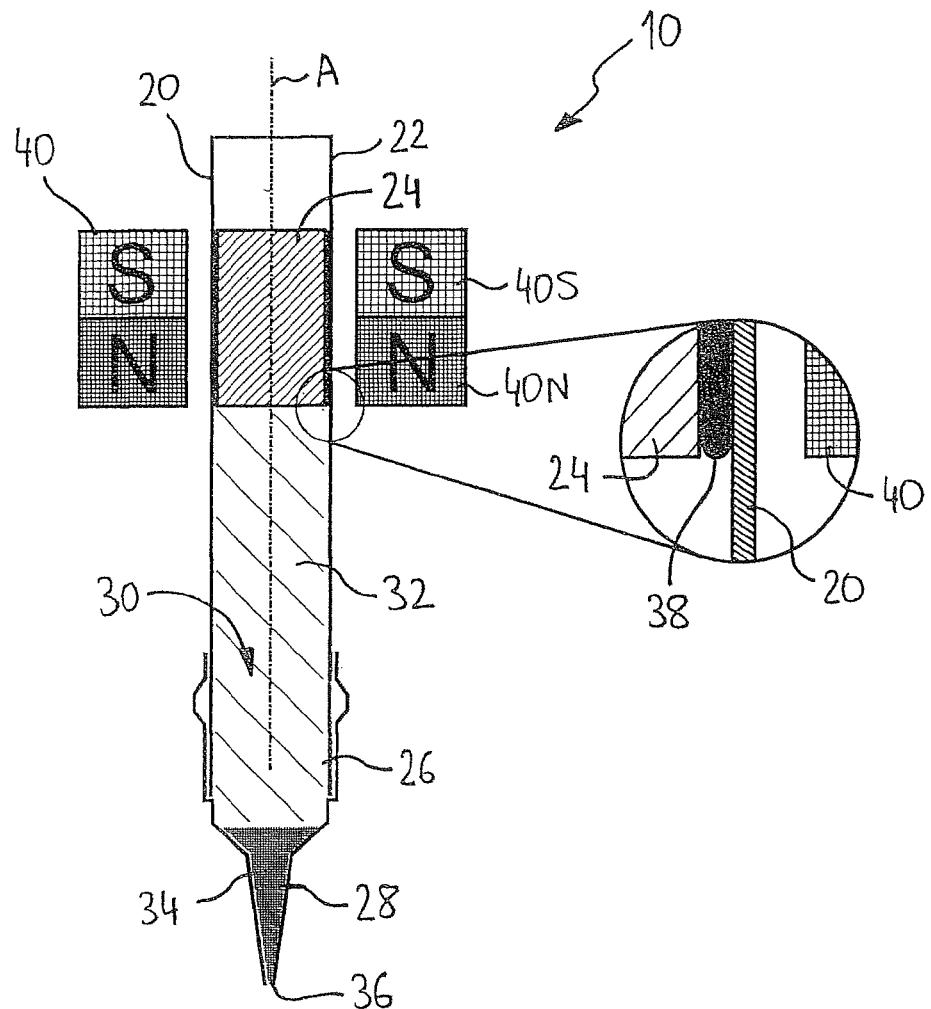

(51) Int. Cl.
  *F04B 7/00* (2006.01)
  *F04B 13/00* (2006.01)
  *F04B 17/04* (2006.01)
  *G01F 25/00* (2006.01)

(56) References Cited

U.S. PATENT DOCUMENTS

| | | | |
|---|---|---|---|
| 4,692,673 | A | 9/1987 | DeLong |
| 5,005,639 | A | 4/1991 | Leland |
| 5,472,323 | A * | 12/1995 | Hirabayashi et al. ......... 417/417 |
| 5,700,959 | A | 12/1997 | Homberg |
| 5,927,564 | A * | 7/1999 | Simonazzi .................... 222/434 |
| 5,952,743 | A * | 9/1999 | Sidey ........................ 310/12.24 |
| 6,722,862 | B2 | 4/2004 | Hartnagel et al. |
| 7,182,228 | B2 | 2/2007 | Krueger |
| 7,362,003 | B2 * | 4/2008 | Stewart et al. ................. 290/42 |
| 7,952,238 | B2 * | 5/2011 | Tu et al. ..................... 310/12.24 |
| 2003/0180152 | A1 * | 9/2003 | Payne ............................ 417/53 |
| 2004/0146433 | A1 | 7/2004 | Massaro |
| 2004/0182545 | A1 * | 9/2004 | Payne ......................... 165/80.4 |
| 2005/0035156 | A1 | 2/2005 | Hersch et al. |
| 2006/0071973 | A1 | 4/2006 | Peeters |
| 2007/0237658 | A1 * | 10/2007 | Burns et al. ................... 417/417 |
| 2008/0247913 | A1 | 10/2008 | Suovaniemi et al. |

FOREIGN PATENT DOCUMENTS

| | | |
|---|---|---|
| DE | 41 04 831 A1 | 10/1992 |
| DE | 43 18 930 A1 | 12/1994 |
| DE | 37 45 068 C2 | 8/1995 |
| DE | 199 09 252 A1 | 8/2000 |
| DE | 101 09 948 A1 | 9/2002 |
| DE | 102 44 960 A1 | 4/2004 |
| EP | 0 605 903 A1 | 7/1994 |
| EP | 1 287 326 A1 | 3/2003 |
| JP | S58-216744 A | 12/1983 |
| JP | H02-027168 A | 1/1990 |
| JP | 2004-308875 A | 11/2004 |
| JP | 2007-085214 A | 4/2007 |
| JP | 2006-516736 A | 7/2008 |
| JP | 2009-517291 A | 4/2009 |
| WO | 01/61308 A1 | 8/2001 |
| WO | 2004/069413 A1 | 8/2004 |
| WO | 2006/003281 A1 | 1/2006 |
| WO | 2007/061987 A2 | 5/2007 |

OTHER PUBLICATIONS

European Search Report issued for European patent application No. 13177645.2 dated Sep. 5, 2013, 6 pages.

International Search Report issued for International application No. PCT/EP2011/050105 dated Apr. 28, 2011, 6 pages.

German Search Report issued for German patent application No. 10 2010 000 690.4 dated Oct. 21, 2010, 4 pages.

Office Action issued for European patent application No. 11700329.3 dated Jun. 4, 2015, with machine English translation (13 pages).

English translation of Office Action issued for Japanese patent application No. 2012-547507 dated Aug. 10, 2015 (2 pages).

* cited by examiner

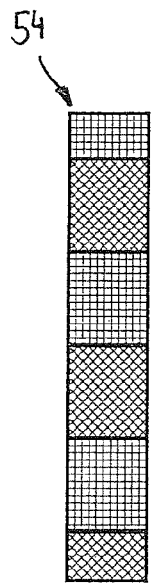 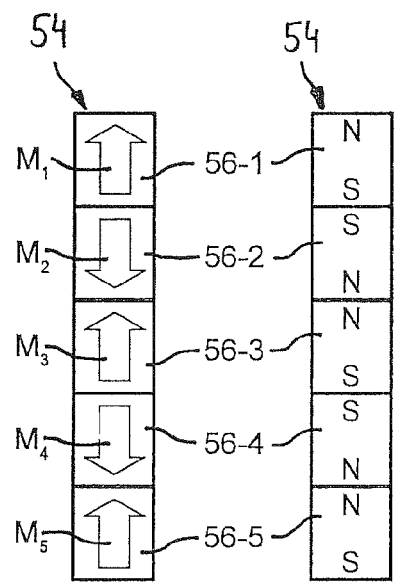 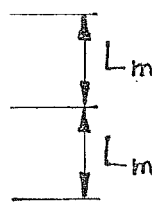
Fig. 5a  Fig. 5b  Fig. 5c
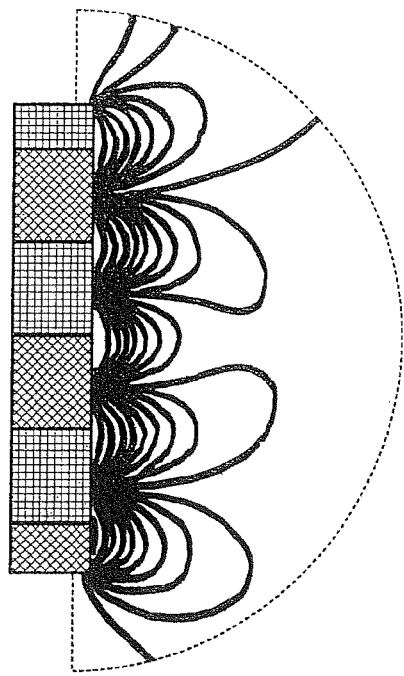
Fig. 6

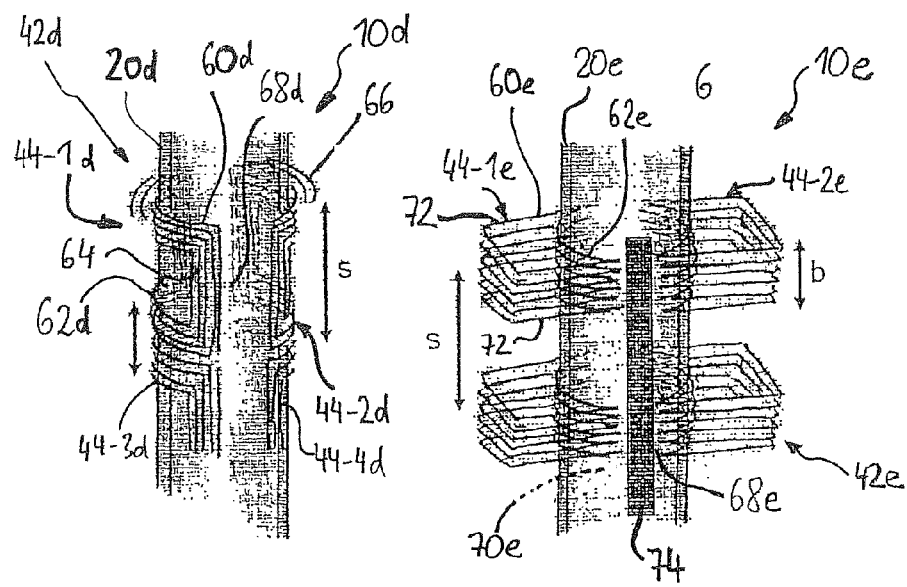
Fig. 7    Fig. 8
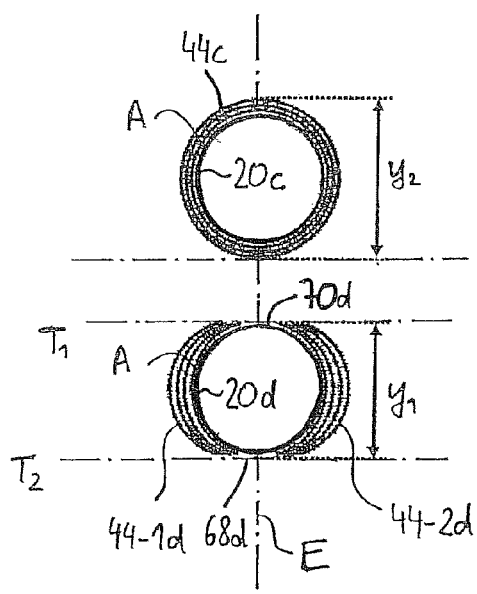
Fig. 9
Fig. 10

METERING DEVICE AND METERING METHOD

CROSS REFERENCE TO RELATED APPLICATION

This application is a 35 U.S.C. 371 National Phase Entry Application from PCT/EP2011/050105, filed Jan. 5, 2011, which claims the benefit of German Patent Application No. 10 2010 000 690.4 filed on Jan. 5, 2010, the disclosures of which are incorporated herein in their entirety by reference.

The present invention relates to a metering device, comprising a guide tube, a piston inserted displaceably in the guide tube and a chamber for accommodating a medium to be metered, the medium to be metered being aspiratable or dispensable in accordance with the displacement of the piston. The invention further relates to a metering method using such a metering device.

Examples of metering devices of the above type are pipettes with a glass tube, at the end of which a piston is displaceably introduced and an the other end of which a nozzle is arranged, through which the medium to be metered may be aspirated (drawn up) or dispensed (discharged) in accordance with the displacement of the piston. A liquid or gaseous displacement medium may additionally be arranged between the piston and the medium to be metered, such that the medium to be metered may also be pushed completely out of the chamber, or indeed minuscule quantities may be drawn up.

To actuate the piston in the guide tube, actuating arrangements are known which are coupled to the piston and for example convert rotary motion of an adjusting element into translatory motion of the piston. Rotary motion of the adjusting element may here be brought about manually or using an electric motor, a specific angular amount of the rotation or a specific number of revolutions of the adjusting elements being converted into a specific displacement of the piston and thus into a specific aspirated or dispensed volume (dose) of the medium to be metered.

For some applications, in particular in the laboratory field, accurate metering, i.e. accurate measurement of the quantity of aspirated or dispensed medium is of great importance. It is then attempted in known metering devices to achieve maximally precise positioning of the piston and maximally uniform movement of the piston by means of a relatively complex mechanical reduction gear or using precision electric motors. Although it is possible to achieve comparatively high positioning accuracy with a step-down gear, the dynamics of the metering process are impaired to the same degree, since step-down gears are very sluggish. In addition, such gear units are cost- and maintenance-intensive. Drive by way of electric motors for the most part likewise requires the use of reduction gears or is associated with a loss of the accuracy due to the clearance of the motor in the case of direct motor drive of the piston.

A further known problem of conventional metering devices lies in the necessary precise adaptation between piston and guide tube, such that on the one hand the piston is sufficiently well sealed relative to the guide tube to prevent outlet of medium to be metered or displacement medium or the penetration of air, and on the other hand the piston is not seated too tightly in the guide tube, so as to allow displacement of the piston by a given displacement path.

Against this background, it is the object of the present invention to provide a metering device of the above-mentioned type and a metering method making use of such a metering device, with which a medium to be metered may be aspirated or dispensed with relatively high metering accuracy and which may preferably be embodied simply and inexpensively.

According to a first aspect of the invention, this object is achieved by a metering device, comprising a guide tube, a piston inserted displaceably in the guide tube, an actuating arrangement for exerting a force on the piston, to displace the piston in the guide tube, and a chamber for accommodating a medium to be metered, the medium to be metered being aspiratable or dispensable in accordance with displacement of the piston and the actuating arrangement being designed, according to the invention, for magnetic interaction with the piston.

An important aspect of the invention thus lies in actuation of the piston through magnetic interaction. This means that a force for displacement of the piston in the guide tube is a magnetic force resulting from a magnetic field. In contrast to conventional metering devices, movement of the piston thus proceeds not by mechanical force transmission between an adjusting element and the piston but rather by contactless magnetic interaction. The absence of mechanical coupling between actuating arrangement and piston eliminates sources of errors, which cannot be avoided in conventional metering devices due to actuating gear clearance or motor clearance or due to friction. Thus, the metering device according to the invention may very largely prevent the transmission of vibrations, clearance-related gear impacts etc. to the piston in the event of the magnetic field being generated and changed by means of a magnetic field generating means moved by a step-down gear. Accordingly, a metering device according to the invention allows a medium to be metered to be drawn up or discharged with particularly high metering accuracy.

In addition, movement of the piston by means of magnetic force permits highly dynamic metering. If the magnetic field is reset by electrical or electronic means during the metering process, for example by switching over coils, movement of the piston can proceed with very little delay.

In principle, the piston could itself generate a magnetic field, for example comprise a permanent magnet, such that it may interact with a magnetic or magnetisable (in particular ferromagnetic) element of the actuating arrangement and displacement of the piston could be brought about by movement of the magnetic or magnetisable element of the actuating arrangement relative to the guide tube. With regard to driving of the magnetic field for metering the medium, it is however deemed advantageous for the actuating arrangement to comprise a magnetic field generating means for generating a magnetic field. Thus the means for generating and driving the magnetic field outside the guide tube are arranged at a magnetically effective distance.

For interaction with the magnetic field generating means, it is preferable for the piston to be formed at least in part of a magnetisable material or of a permanent magnetic material. A magnetisable material is preferably understood to be a ferromagnetic material. However, the term also covers paramagnetic, diamagnetic (superconductor) or ferrimagnetic materials, provided that they exhibit sufficient magnetisability in the magnetic field to exert a force on the piston which is significant with regard to displacement in the guide tube.

In a further preferred embodiment, the piston may be formed of a magnetisable liquid, preferably of a ferrofluid. This embodiment allows particularly highly dynamic movement of the piston due to the particularly low frictional forces between piston and guide tube. In addition, the ferrofluid by nature seals the guide tube very simply and reliably relative to the guide tube, such that reliable operation of the metering device may be ensured by simple means. In the magnetic field, the magnetisable liquid attempts to remain in the region of the higher magnetic field strength, such that the magnetisable liquid on the one hand remains distributed in a reliably sealing manner in the guide tube and on the other hand is movable in the guide tube in accordance with the external magnetic field.

The magnetic field generating means of a metering device according to the invention preferably generates a magnetic field whose magnetic flux passes through the piston substantially axially relative to the guide tube. With the magnetic flux oriented in this manner, the interaction between magnetic field and piston is oriented in the direction of displacement of the piston, such that the force action on the piston may act efficiently in the direction of displacement of the piston. In order ultimately to achieve movement of the piston for metering the medium, a change in the size, orientation or position of the magnetic field is necessary. In the simplest case this may be achieved by switching the magnetic field on or off, such that the piston is for example attracted or repelled by the magnet for a given period and so displaced by a specific distance. Alternatively or in addition, the magnetic field may be moved relative to the guide tube by movement of the magnetic field generating means, such that the piston follows this movement. As a further alternative or additional possibility, the direction or strength of the magnetic flux of the magnetic field could be changed or "deformation" of the magnetic field could be brought about by local modification of the direction and strength of the magnetic flux, in accordance with which the magnetic forces acting on the piston change and lead to displacement of the piston (for example in an arrangement with a plurality of magnets and/or coils by controlling/moving individual magnets/coils).

In one particularly simple embodiment, the magnetic field generating means may comprise an annular permanent magnet which coaxially surrounds the guide tube. To move the piston, the permanent magnet may then be displaced in the axial direction of the guide tube, the piston in particular being urged to remain in the centre of the annular permanent magnet. Alternatively, the permanent magnet could also be magnetised such that the piston is repelled thereby.

A further preferred embodiment provides for the magnetic field generating means to comprise a coil arrangement with at least one coil, the turns of which coaxially surround the guide tube. Such a coil may build up a variable magnetic field through control of the current intensity supplied thereto, so as to draw the piston with adjustable force in the direction of its axial centre. The coil may alternatively or additionally be displaced coaxially to the guide tube, to move the piston.

Particular possibilities for flexible and accurate metering are provided by an embodiment in which the magnetic field generating means comprises a coil arrangement with a plurality of coils, whose turns each coaxially surround the guide tube, the coils being offset axially relative to one another. By adjusting the current intensities supplied to the individual coils, the magnetic field prevailing in the guide tube may then be modified with regard to its total strength and with regard to its axial flux distribution, in order to draw the piston to a defined position in the guide tube. In a simple case, two coils arranged with axial spacing could be operated alternately, so as to move the piston to and fro between two positions.

For the purposes of the present invention, a coil arrangement with a plurality of coils also includes an arrangement of the autotransformer type, which comprises a continuous coil winding with contacts at the ends and a centre tap contact, such that the two coil portions between the end contacts and the centre tap contact may be individually driven. In further variants of such a coil arrangement, the centre tap contact could be displaced along the coil axis between the end contacts, in order to modify the ratio of the number of turns of the two coil portions.

A large number of further possibilities are known to a person skilled in the art for generating a magnetic field and arranging the piston of the metering device according to the invention in the magnetic field and bringing about desired displacement of the piston in the guide tube through modification of the magnetic field or movement of other elements of the metering device.

The metering device of the invention preferably further comprises a control device for controlling the size and/or the position and/or the direction of the magnetic field, such that movement of the piston and the position of the piston in the guide tube may be driven. An electronic control device allows reliable, rapid and precise movement and positioning of the piston and, if desired, also closed-loop control of the piston position by feedback of a detection value indicating the movement or position of the piston, for example from a position detector or a balance detecting the quantity of aspirated or dispensed medium.

According to a second aspect of the invention, the object of the invention is achieved by a metering device, comprising a guide tube, a piston inserted displaceably in the guide tube and a chamber for accommodating a medium to be metered, the medium to be metered being aspiratable or dispensable in accordance with displacement of the piston, a lubricant film of a magnetisable liquid being arranged according to the invention between the piston and the guide tube and the metering device comprising a magnetic field generating means for generating a magnetic field acting on the lubricant film. The characterising feature also of the second aspect of the invention is thus the use of a magnetisable material in the region of the piston of the metering device, to assist movement of the piston for metering the medium by magnetic interaction. According to the second aspect of the invention, the magnetic field of a magnetic field generating means ensures that the lubricant film formed of magnetisable liquid reliably remains in the space between piston and guide tube. This has on the one hand the advantage of enabling highly dynamic low-friction movement of the piston. On the other hand, the second aspect of the invention enables the achievement of significantly increased sealing of the chamber relative to the surroundings of the metering device.

A metering device of the invention particularly preferably combines together features of the first aspect and features of the second aspect of the invention, i.e. the magnetic field not only ensures a stable lubricant film of a magnetisable liquid between piston and guide tube, but also simultaneously moves the piston in the guide tube for metering the medium. This takes advantage of the fact that the lubricant film may be particularly reliably prevented from escaping if the lubricant film is located at the location of the piston and moves together with the piston in the magnetic field.

In order to be able reliably to predetermine the axial position of the lubricant film, the magnetic field generating means should preferably be designed to generate a magnetic field whose magnetic flux is oriented substantially axially to the guide tube at the location of the piston. If this embodiment is also combined with features of the first aspect of the invention, the position of the piston may be reliably established in the magnetic field, since the direction of displacement of the piston substantially coincides with the direction of the magnetic field at the location of the piston.

According to a third aspect of the invention, the object of the invention is achieved by a metering method for metering a medium using a metering device, in particular a metering device according to the first and/or second aspect of the invention, the metering device comprising a guide tube, a piston inserted displaceably in the guide tube and a chamber for accommodating the medium to be metered, the medium to be metered being aspirated or dispensed in accordance with displacement of the piston and the metering method comprising the steps of: providing a magnetic field and exerting a force on the piston by magnetic interaction of the piston with the magnetic field. Such a metering method also makes it possible to achieve highly dynamic simple and accurate metering, by exerting a magnetic force on the piston substantially without mechanical coupling, said force resulting from interaction of the piston with a magnetic field. By changing the position, direction or size of the magnetic field or by deforming the magnetic field, movement of the piston may then take place in the guide tube for metering the medium.

The metering method may preferably be carried out using a metering device according to the embodiments of the first and/or second aspect of the invention, in order to achieve the effects and advantages described for the respective embodiments of the first or second aspect of the invention.

If the metering method is carried out with a metering device which comprises a coil arrangement with a plurality of coils, whose turns in each case coaxially surround the guide tube, the coils being offset axially relative to one another, the current intensities supplied in each case to the coils may be controlled in accordance with the dose to be aspirated or dispensed, in order rapidly and accurately to draw up or discharge the desired quantity of medium to be metered with electronic means.

According to a fourth aspect of the invention, this object is achieved by a metering device, comprising a guide tube, a piston inserted displaceably in the guide tube, an actuating arrangement for exerting a force on the piston, to displace the piston in the guide tube, and a chamber for accommodating a medium to be metered, the medium to be metered being aspiratable or dispensable in accordance with displacement of the piston, the actuating arrangement being designed for magnetic interaction with the piston and the piston comprising a permanent magnet. The permanent magnet of the piston of the fourth aspect of the invention retains defined magnetisation even without permanent energy input, which magnetisation may be used for positioning or movement of the piston by the actuating arrangement. Use of a permanent magnet thus allows a reduction in the energy needed to operate the metering device.

The piston of the metering device of the fourth aspect preferably comprises at least two mutually adjacent permanent magnet portions, the magnetisations of which extend axially relative to the guide tube, the magnetisations of mutually adjacent permanent magnet portions being directed in opposite directions relative to one another. In such an arrangement, relatively strong, radially extending magnetic fields may be generated at the points at which the direction of the magnetisations changes, i.e. in the junction region of neighbouring permanent magnet portions, said magnetic fields allowing particularly accurate positioning and high spatial resolution of the axial position of the piston. This increase in accuracy, which is reflected in an improved metering accuracy of the metering device, is attributable to the greater relative change in the magnetic field on axial displacement of the piston.

Although the above-stated effect is achieved with provision of just two mutually adjacent permanent magnet portions with mutually opposing magnetisations, a preferred embodiment of the invention according to the fourth aspect provides arranging more than two permanent magnet portions in the axial direction of the guide tube, respectively adjacent permanent magnet portions having mutually opposing magnetisations. Since each permanent magnet portion may be understood to comprise a magnetic north pole at its one axial end and a magnetic south pole at its other axial end, the arrangement of permanent magnet portions with alternating directions of magnetisation according to the fourth aspect of the invention may also be described in such a way that mutually adjacent permanent magnet portions face one another either in each case with their south poles or in each case with their north poles. The effect of a particularly strong magnetic field extending radially in a pronounced manner then always arises in precisely the junction regions at which the north poles or the south poles of adjacent permanent magnet portions meet.

In a particularly simple embodiment of the invention of the fourth aspect, provision is made for the permanent magnet portions to be formed of permanent magnets which are fastened together such that magnetic north poles of adjacent permanent magnets are arranged facing one another and adjacent one another or magnetic south poles of adjacent permanent magnets are arranged facing one another and adjacent one another. A piston constructed in this way is particularly simple to produce from a plurality of per se known, cylindrical permanent magnets which are attached to one another, preferably adhesively bonded together, in alternate orientation. A piston according to the fourth aspect of the invention could however alternatively also be achieved by magnetizing a ferromagnetic material with exposure to a correspondingly shaped magnetic field.

In a further embodiment of the invention provision is made for the piston to comprise at least one sealing member, which is arranged between an internal wall of the guide tube and the permanent magnet portions or the permanent magnet. In this way, the advantage is achieved that the permanent magnet of the piston does not itself necessarily have to be a perfect fit with the internal dimensions of the guide tube and a reliable seal may be ensured between the permanent magnet and the guide tube. In this case, it is in particular intended for the at least one sealing member to take the form of a cap and be placed on an axially upper end and/or an axially lower end of the permanent magnet or be placed on an axially uppermost and/or an axially lowermost permanent magnet portion. In this way, the cap-like sealing member may be placed onto the ends of the permanent magnet body in such a way that they each surround the end circumferential portions and the end faces of the permanent magnet body and contact between the medium to be metered and the permanent magnet body may be avoided.

The invention according to the fourth aspect achieves the object of the invention separately and independently of the subject matter of invention aspects one to three. Preferably, however, the features of the metering device of the fourth aspect are combined with one or more features of aspects one to three, in order to achieve the advantages and effects indicated in each case above in connection with aspects one to three.

According to an embodiment of the present invention in accordance with one or more of above-described aspects one to four, provision is made for the actuating arrangement to comprise a magnetic field generating means for generating a magnetic field, the magnetic field generating means comprising a coil arrangement with at least one coil, which comprises at least one turn, the at least one turn surrounding only part of the circumference of the guide tube.

In this embodiment, the at least one turn of the coil thus does not completely surround the guide tube, i.e. is not wound completely (around a 360 degree circumferential angle)

around the guide tube, but rather runs only over a part of the circumference of the guide tube (around a circumferential angle of less than 360 degrees), such that another part of the circumference of the guide tube is free of the turn. In this way, the guide tube is still accessible at the circumferential portion covered by the turn, for example to allow visual inspection of the metering process or to arrange a position detecting element for detecting a position or movement of the piston on the guide tube. Depending on the size of the part not covered by the turn and the profile of the turn, advantages may also be achieved with regard to the arrangement, in particular the density of the arrangement of a plurality of adjacent pipettes or the arrangement of adjacent coils, as will be described below in greater detail.

A similar approach to the above-described embodiment is followed by a further advantageous embodiment of the invention according to one of aspects one to four, in which the actuating arrangement comprises a magnetic field generating means for generating a magnetic field, the magnetic field generating means comprising a coil arrangement with at least one coil, which comprises at least one turn, the at least one turn extending completely on one side of a longitudinal central plane containing a longitudinal centre axis of the guide tube. It may in this way be ensured that the coil takes up substantially only half of the space present around the guide tube, while the other half is completely accessible, for example for a similar second coil, for a position detecting element or indeed for conveniently joining together a plurality of pipettes.

It is here in particular intended for the coil arrangement to comprise a first coil with at least one first turn and a second coil with at least one second turn, the at least one first turn extending completely on the one side of the longitudinal central plane and the at least one second turn extending completely on the other side of the longitudinal central plane. By means of the coils placed on opposing sides on the guide tube, it is possible to generate a particularly uniform and well defined axial magnetic field inside the guide tube or particularly reliably to detect a magnetic field. Part of the circumference of the guide tube in the region of the longitudinal central plane in this case preferably remains uncovered by either a turn of the first coil or a turn of the second coil, so allowing access to the guide tube, for example for a position detecting element or visual inspection of the metering process.

In a preferred variant of the latter two embodiments described above, provision is made for the at least one turn of the coil to extend completely between two mutually parallel tangential planes of the guide tube touching the outer wall of the guide tube. In this variant a high packing density may be achieved, in particular when a plurality of guide tubes are joined together, since adjacent guide tubes may be arranged at a relatively small distance from one another. While in particular a plurality of turns completely surrounding the guide tube rapidly leads to an increased need for space, the minimum spacing between adjacent guide tubes is not determined by the thickness of the at least one turn of the coil when using a coil arrangement according to this variant of the invention. Instead, a row of guide tubes according to this variant of the invention arranged adjacent one another are joined together in such a way that the above described tangential planes of adjacent guide tubes extend substantially parallel to one another. The guide tubes may then be arranged so closely adjacent one another that the outer walls of adjacent guide tubes touch or almost touch.

One turn portion surrounding just part of the circumference of the guide tube preferably extends along an outer wall of the guide tube, specifically in the circumferential direction of the guide tube. One such turn portion may generate an axially extending magnetic field inside the guide tube, which field may interact with the piston.

In addition, a portion of the at least one turn may extend axially along an outer wall of the guide tube. Such an axial turn portion is preferably connected to an above-described circumferentially extending turn portion within the same turn, such that the magnetic field generated by the axial turn portion tends to develop less interaction with the piston and the axial turn portion primarily serves to supply/discharge current to/from the circumferentially extending turning portion.

A particularly advantageous combination of the circumferentially extending turn portion and of the axial turn portion is obtained together with the above-described fourth aspect of the invention, in which the piston comprises at least one permanent magnet, in particular a plurality of mutually adjacent permanent magnet portions with alternating magnetisation directions. Advantageously, the axial length of the axially extending turn portion may then be adapted to a length of the permanent magnet portion or of the permanent magnet.

A further variant of the invention provides that the at least one turn portion surrounding just one part of the circumference of the guide tube, which turn portion extends towards the guide tube, then extends along the guide tube and then away from the guide tube. In this variant, parts of the turn, which are not capable of contributing to generation of the desired magnetic field at the location of the piston, are guided at a distance from the guide tube, such that its magnetic field does not interfere with the magnetic field of the active parts of the turn, which extend along the guide tube. A readily definable, relatively homogeneous magnetic field may be built up inside the guide tube, although the at least one turn does not completely surround the guide tube unlike in the case of a normal coil turn.

As already indicated, a position detecting element may be arranged at the part of the circumference of the guide tube not surrounded by the at least one turn. This position detecting element may be part of a position detector, which detects a detection value indicating the movement or the position of the piston by means of the position detecting element. This detection value may in particular be used for the closed-loop control of the piston position mentioned in conjunction with the first aspect of the invention, a control device controlling the piston position by feedback of the detection value. This makes very precise, automated metering possible.

The position detecting element may likewise be designed for magnetic interaction with the piston, i.e. may determine a position and/or movement of the piston in particular by detecting a magnetic field generated by the piston. The magnetic field generated by the piston may be used simultaneously both to control the piston (force transmission to the piston) and to detect the position/movement of the piston, so simplifying construction.

Figure 2:
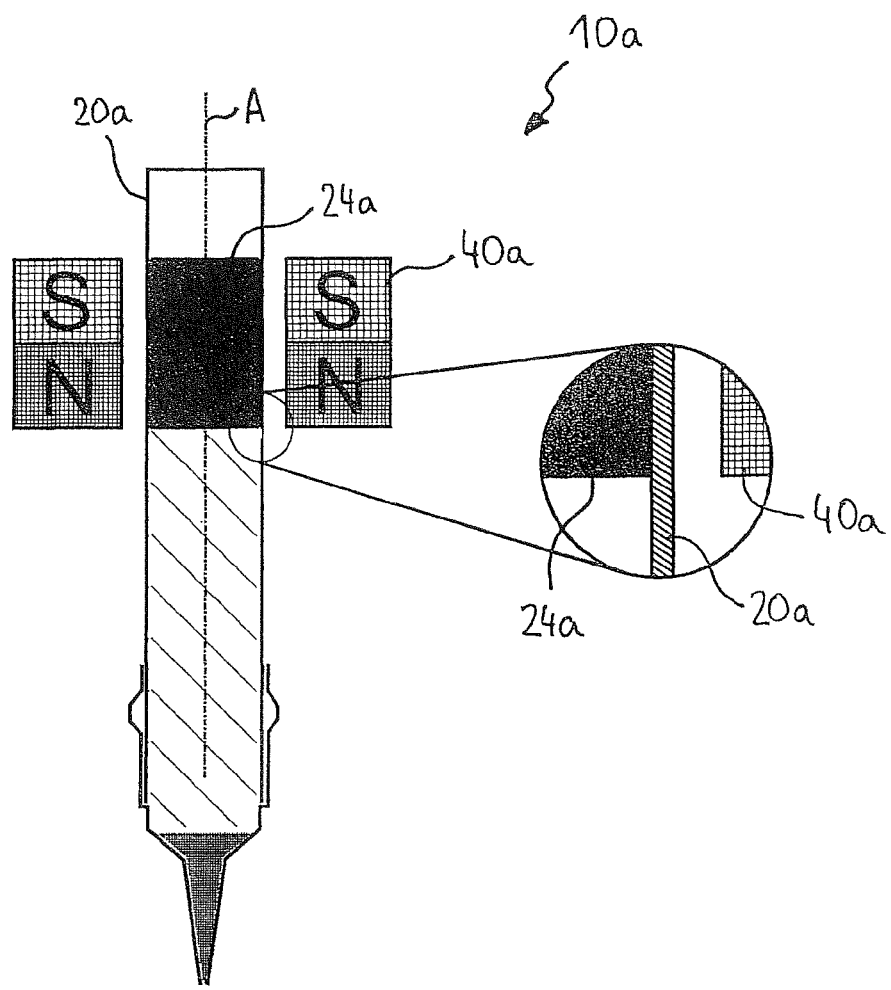
Figure 3:
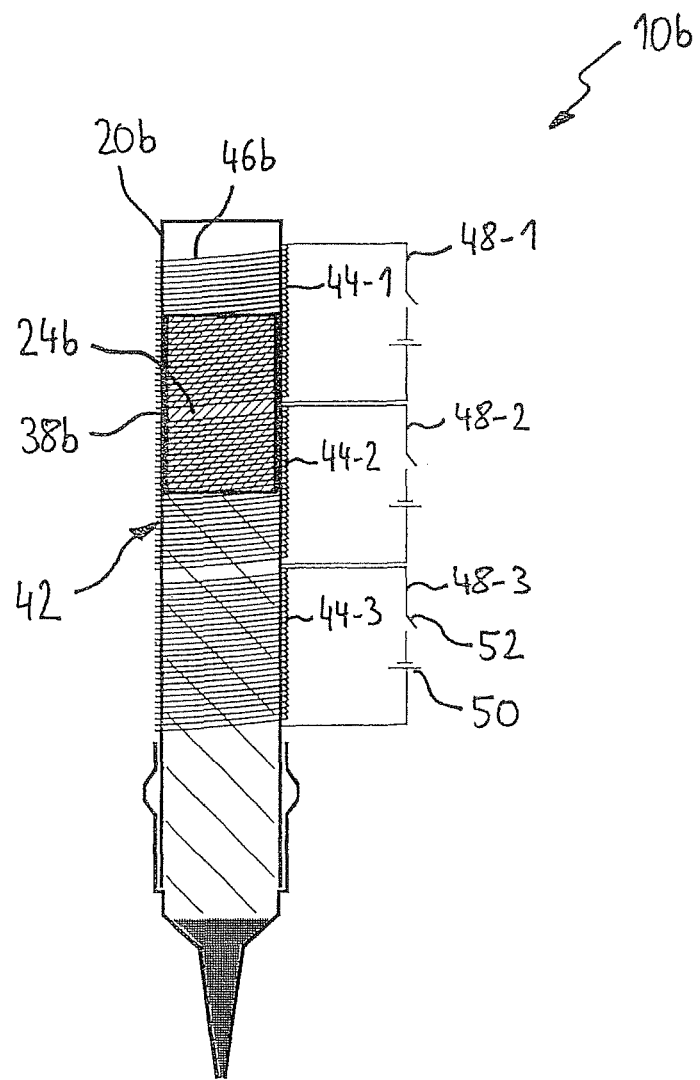
Figure 4:
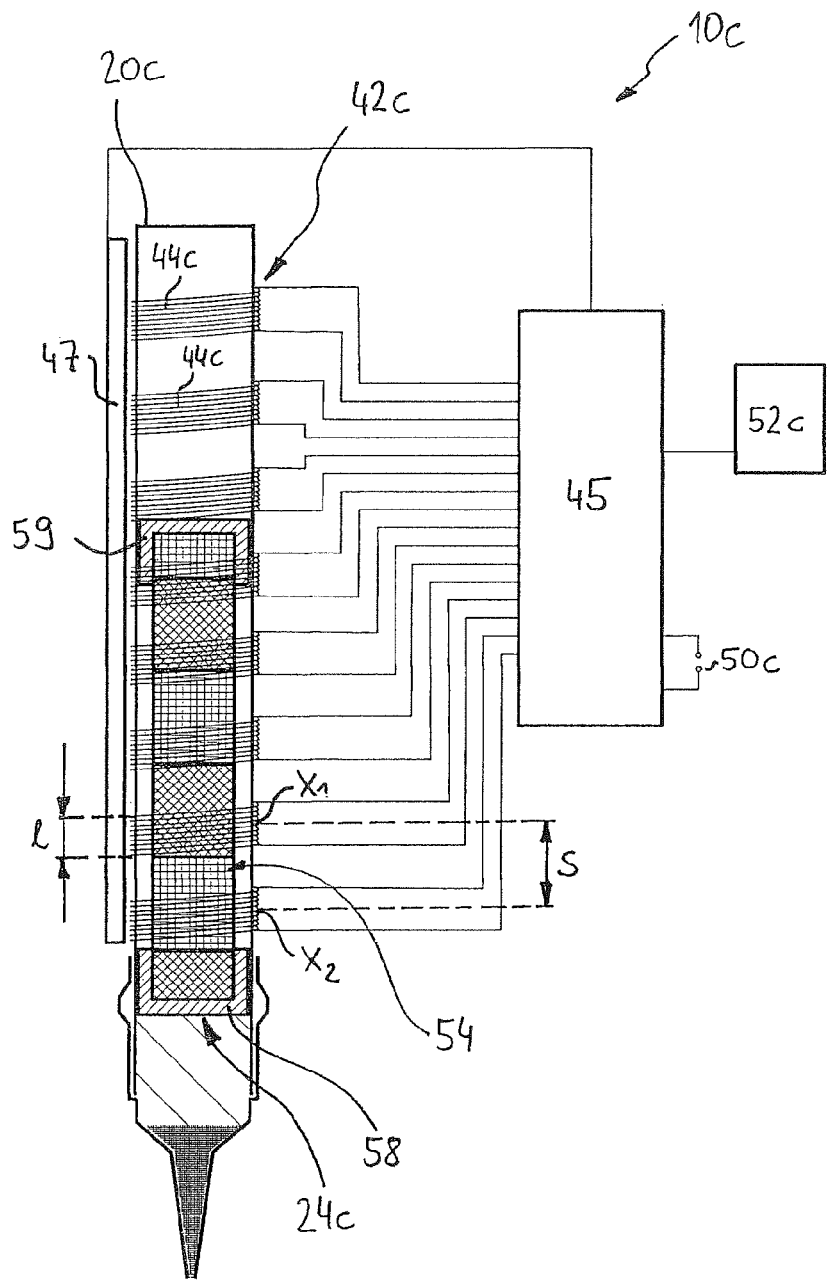

The invention is explained in greater detail below on the basis of preferred exemplary embodiments with reference to the attached drawings, in which:

FIG. 1 is a cross-sectional view of a pipette according to a first exemplary embodiment of the invention, plus an enlarged portion, FIG. 2 is a cross-sectional view of a pipette according to a second exemplary embodiment of the invention, plus an enlarged portion, FIG. 3 is a schematic side view of a pipette according to a third exemplary embodiment of the invention, FIG. 4 is a side view of a pipette according to a third exemplary embodiment of the invention, FIGS. 5a to 5c are illustrations of magnetisation of a permanent magnet body of a piston of the pipette shown in FIG. 4, FIG. 6 is an illustration of the field line profile of the magnetic field of the permanent magnet body shown in FIGS. 5a to 5c, FIG. 7 is a perspective view of a portion of a pipette according to a fourth exemplary embodiment of the invention, FIG. 8 is a perspective view of a portion of a pipette according to a fifth exemplary embodiment of the invention, FIG. 9 is a cross-sectional view of the pipette shown in FIG. 4 in an axially normal section plane, and FIG. 10 is a cross-sectional view of the pipette shown in FIG. 7 in an axially normal section plane.

A pipette 10 of the first exemplary embodiment, shown in FIG. 1, comprises a cylindrical guide tube 20 made of a glass material, into the upper, open end 22 of which a piston 24 is inserted displaceably and to the opposing, lower end 26 of which a nozzle portion 28 is attached.

The inside of the nozzle portion 28 and the inside of the guide tube 20 between the piston 24 and the nozzle portion 28 form a chamber 30, which is filled in the exemplary embodiment partially by a displacement medium 32 and otherwise by a medium 34 to be pipetted. The displacement medium 32 adjoins the piston 24, while the medium to be pipetted adjoins a nozzle opening 36 of the nozzle portion 28.

Movement of the piston 24 in the axial direction of the guide tube 20, i.e. along a longitudinal centre axis A of the guide tube 20, brings about a change in the volume of the chamber 30 and accordingly expulsion (dispensing) of medium to be pipetted out of the nozzle opening 36 or drawing up (aspiration) of medium 34 to be pipetted through the nozzle opening 36 into the chamber 30.

The piston 24 is formed at least in part of magnetisable material and in the exemplary embodiment is made completely of a ferromagnetic metal. Between the outer circumference of the piston 24 and the internal wall of the guide tube 20 there is arranged a lubricant film 38 of a ferrofluid, such that the ferrofluid film 38 completely surrounds the piston 24 and seals it on all sides relative to the guide tube.

The lubricant film 38 thus serves both in sealing and also in low-friction guidance of the piston 24 in the guide tube 20.

The guide tube 20 is passed concentrically through an annular permanent magnet 40. The permanent magnet 40 is magnetised in such a way that its magnetic north pole 40N and its magnetic south pole 40S are offset axially relative to one another. In the exemplary embodiment, the north pole 40N faces the nozzle portion 28, and the south pole 40S faces the open end 22 of the guide tube 20. It goes without saying that the ring may be placed on the guide tube 20 in a different orientation, such that its magnetic south pole 40S faces the nozzle portion 28.

The permanent magnet ring 40 generates a virtually homogeneous magnetic field at its centre, i.e. at the location of the piston 24, the field lines of which magnetic field extend parallel to the longitudinal centre axis A. The ferromagnetic material of the piston 24 is magnetised by the magnetic field. Magnetic interaction in the form of an attraction force between the piston 24 and the permanent magnet ring 40 then takes place between the magnetisable piston 24 and the magnetic field of the permanent magnet 40.

The piston 24 is accordingly constantly urged to position itself in the centre of the permanent magnet ring 40. If the permanent magnet ring 40 is moved axially relative to the guide tube 20, the piston 24 follows this movement and accordingly aspirates or dispenses the medium to be pipetted 34 through the nozzle opening 36.

The permanent magnet ring 40 may be moved manually or automatically by suitable movement control means, wherein movement may be driven, monitored or regulated by means of an electronic control device in a manner known per se to a person skilled in the art. Irrespective of how the permanent magnet ring 40 is moved, transmission of the movement from the permanent magnet ring 40 to the piston 24 proceeds contactlessly solely by magnetic interaction, such that vibrations, play-related impacts, mechanical inaccuracies and the like may be decoupled from the piston 24 and from the guide tube 20, so making very accurate metering possible. Said decoupling may furthermore prevent contamination of the actuating arrangement and optionally of the control device by medium to be pipetted or conversely contamination of the medium to be pipetted for example by lubricants of a moving means for the permanent magnet 40.

In addition, the permanent magnet ring 40 may be moved at high speed, to achieve highly dynamic metering. The lubricant film 38 assists in rapid movement of the piston 24 with low friction losses. The lubricant film 38 formed of ferrofluid is likewise magnetised in the magnetic field of the permanent magnet ring and thus also enters into magnetic interaction with the outer magnetic field. As a result of the resultant attraction force between lubricant film 38 and permanent magnet ring 40, the lubricant film 38 is held reliably together with the piston 24 at the same axial height as the permanent magnet ring 40, such that the lubricant film 38 always remains in the space between piston 24 and internal wall of the guide tube 20.

A second exemplary embodiment of the invention is explained below with reference to FIG. 2. Identical or corresponding elements of the second exemplary embodiment are designated with the same reference signs as in the first exemplary embodiment, but with the additional suffix "a", and are explained below only in terms of their differences from the first exemplary embodiment, reference otherwise explicitly being made to the description of the first exemplary embodiment.

The pipette 10a of the second exemplary embodiment comprises a guide tube 20a with a piston 24a inserted displaceably therein, which is formed completely of a magnetisable liquid, in particular of a ferrofluid.

As in the first exemplary embodiment, in the second exemplary embodiment the guide tube 20a of the pipette 20a is also passed coaxially through a permanent magnet ring 40a, such that the piston 24a is arranged in the magnetic field of the permanent magnet ring 40a. The magnetic field performs two functions in the second exemplary embodiment. First of all, it prevents the ferrofluid from leaking out, since the ferrofluid is constantly urged to stay in the region of maximum magnetic field strength, i.e. is drawn into the centre of the permanent magnet ring 40a and thus reliably seals the guide tube 20a at its internal wall over the entire circumference. Secondly, by moving the magnetic field, in particular by displacing the permanent magnet ring 40a in the axial direction of the guide tube 20a, the ferrofluid piston 24a may be displaced along the longitudinal centre axis A of the guide tube 20a, in order to aspirate or dispense a given quantity of medium to be pipetted corresponding to the displacement distance.

Pipetting may proceed very dynamically, as in the first exemplary embodiment, since the ferrofluid slides in low friction manner in the guide tube 20a.

In the first and second exemplary embodiments, the magnetic field is generated by a permanent magnet ring 40 or 40a.

In general, the magnetic field may however be provided in many and varied ways in embodiments of the invention, in particular by an electromagnet. One example of an arrangement in which the magnetic field is generated by an electromagnet is explained in greater detail below with reference to FIG. 3 as a third exemplary embodiment of the invention. Only the features which differ from the first exemplary embodiment (FIG. 1) are studied in greater detail, while explicit reference is made to the description of the first exemplary embodiment for the remaining features which are not described again in detail. In FIG. 3 identical or corresponding elements are designated with the same reference signs as in FIG. 1, but with the additional suffix "b".

In a pipette 10b of the third exemplary embodiment a piston 24b comparable with the piston 24 of the first exemplary embodiment is inserted displaceably into a guide tube 20b, which is formed of a magnetisable metal. A lubricant film 38b of a ferrofluid is arranged between the outer circumference of the piston 24b and the internal wall of the guide tube 20b.

Unlike in the first exemplary embodiment, in the third exemplary embodiment the magnetic field needed for moving the piston 24b is not generated by a permanent magnet, but rather by a coil arrangement 42, which comprises three coils 44-1, 44-2, 44-3 arranged in series in the axial direction A of the guide tube 20b. Each of the coils 44-1, wound coaxially to the longitudinal centre axis A around the outer circumference of the guide tube 20b. The initial and final turn of each coil 44-1, 44-2, 44-3 are each connected to separate electric circuits 48-1, 48-2, 48-3, with which each coil 44-1, 44-2, 44-3 may be supplied with voltage individually and independently of the other coils. In the exemplary embodiment, each of the electric circuits 48-1, 48-2, 48-3 comprises a voltage source 50 and a switch 52 connected in series thereto. The voltage sources 50 may be connected together or supplied by a common current supply means.

Depending on the switch position of the respective switch 52 of the electric circuits 48-1, 48-2, 48-3, the coils 44-1, 44-2, 44-3 may build up inside them a magnetic field with field lines extending parallel to the longitudinal centre axis A or the inside of the coils 44-1, 44-2, 44-3 remains without a field. Depending on the switch position of the switch 52, the piston 24b is accordingly attracted by the magnetic field of one of the coils 44-1, 44-2, 44-3 or by a magnetic field built up by two or three of the coils 44-1, 44-2, 44-3 and drawn into the centre of this magnetic field, such that movement of the piston 24b in the guide tube 20b may be driven by the switch 52.

The switches 52 are connected to a control device, not shown, which purposefully drives current supply to the coils 44-1, 44-2, 44-3 on the basis of a quantity of medium to be pipetted set by a user. In a simple control example, the coil 44-1 could be switched on (switch 52 of the electric circuit 48-1 closed), while the other two coils 44-2, 44-3 are switched off (switch 52 of the electric circuit 48-2, 48-3 open), such that only the coil 44-1 generates a magnetic field and the piston 24b is drawn into the coil 44-1. To discharge a quantity of medium to be pipetted out of the nozzle portion, the coil 44-2 could then be switched on, the first coil 44-1 being switched off at the same time. The piston 24b is then drawn into the centre of the second coil 44-2 and in the process displaces the corresponding quantity of displacement medium or medium to be pipetted out of the guide tube 20b. The third coil 44-3 could then accordingly be switched on and the second coil 44-2 could be switched off.

More options than just switching on or off may be available for the coils 44-1, 44-2, 44-3. For more accurate metering of discharge, specific current intensities of between 0 and a maximum value could be supplied to each of the coils. If different current intensities are supplied to two neighbouring coils 44-1/44-2 or 44-2/44-3, a person skilled in the art may readily calculate from the ratio of the current intensities the actual superimposed magnetic field and effect very accurate positioning of the piston 24b along the longitudinal centre axis A in the guide tube 20b by adjusting specific current intensities. This makes it possible to meter the medium to be pipetted precisely without mechanical interaction between the control device and the piston 24b. In addition, the currents in the individual electric circuit 48-1, 48-2, 48-3 may be switched very rapidly, such that highly dynamic metering may be achieved.

A third exemplary embodiment of the invention is explained below with reference to FIGS. 4 to 6. Identical or corresponding elements of the third exemplary embodiment are designated with the same reference signs as in the first exemplary embodiment, but with the additional suffix "c", and are explained below only in terms of their differences from the first exemplary embodiment, reference otherwise explicitly being made to the description of the first exemplary embodiment.

A pipette 10c of the third exemplary embodiment comprises a cylindrical guide tube 20c, in which a piston 24c is inserted displaceably. Unlike in the first and second exemplary embodiments, the piston 24c of the third exemplary embodiment comprises a permanent magnet body 54, which generates a permanent magnetic field.

The structure of the permanent magnet body 54 is illustrated in more detail in FIGS. 5a to 5c. FIGS. 5b and 5c reveal that the permanent magnet body 54 comprises a plurality of (here five) permanent magnet portions 56-1, 56-2, 56-3, 56-4, 56-5, which are arranged in succession in this order in the axial direction of the guide tube 20c. Each of the permanent magnet portions 56-1-56-5 comprises a magnetisation $M_1$-$M_5$, the direction of magnetisation of which is indicated in FIG. 5b in each case by an arrow. Accordingly, the magnetisations $M_1$-$M_5$ of all the permanent magnet portions 56-1-56-5 are oriented axially (parallel to the longitudinal centre axis A), wherein however the direction of the magnetisations $M_1$-$M_5$ of adjacent permanent magnet portions 56-1-56-5 are in each case opposed to one another, such that the magnetisations point in the one direction or the other direction alternately from permanent magnet portion to permanent magnet portion in the axial direction. Thus, for instance, in the exemplary embodiment according to FIG. 5 $M_1$ points upwards, $M_2$ downwards, $M_3$ upwards, $M_4$ downwards and $M_5$ upwards.

In the exemplary embodiment all the permanent magnet portions 56-1-56-5 are of the same axial length $L_m$. In the permanent magnet body 54, the direction of magnetisation thus changes axially at distances of in each case $L_m$.

The magnetisations $M_1$-$M_5$ may also be symbolised by indicating the magnetic north poles or magnetic south poles of the individual permanent magnet portions 56-1-56-5, as shown in FIG. 5c. The permanent magnet body 54 is then produced by joining together the permanent magnet portions 56-1-56-5 in such a way that mutually adjacent permanent magnet portions 56-1-56-5 in each case adjoin one another with their like poles. In the exemplary embodiment, the south pole of the permanent magnet portion 56-1 adjoins the south pole of the permanent magnet portion 56-2, while the north pole of the permanent magnet portion 56-2 adjoins the north pole of the permanent magnet portion 56-3, and so on.

The permanent magnet body 54 may be simply produced by joining together a plurality of individual permanent magnets corresponding to the permanent magnet portions 56-1-

56-5 with their like poles against one another and for example adhesively bonding them together. In the exemplary embodiment according to FIGS. 5a to 5c, the permanent magnet body 54 may thus be formed by connecting five individual permanent magnets.

A permanent magnet body 54 constructed as described above comprises a characteristic magnetic field varying greatly in the axial direction, as illustrated in FIG. 6 in a field line illustration. It should be noted that, in particular at the points at which the orientation of the magnetisation $M_1$-$M_5$ changes, i.e. at the junctions between adjacent permanent magnet portions 56-1-56-5, a strongly radial, high magnetic field arises, which is oriented alternately outwards or inwards. This pronounced magnetic field characteristic may be used for precise control or detection of the piston, as described further hereinafter.

In principle, the permanent magnet body 54 could be of such a shape as to be insertable with a perfect fit and a satisfactory sealing action into the inside of the guide tube 20c and to itself act directly as a piston. Preferably, however, the piston 24c additionally comprises at least one sealing member 58, 59, which is arranged between the permanent magnet body 54 and an internal wall of the guide tube 20c. In the exemplary embodiment, two sealing bodies 58, 59 are provided, which are in each case placed onto end portions of the permanent magnet body 54, such that they each surround the end circumferential portions and the end faces of the permanent magnet body 54. The sealing bodies 58, 59 may for example be placed as well-fitting rubber caps onto the ends of the permanent magnet body 54.

FIG. 4 shows a coil arrangement 42c with a plurality of coils 44c, whose turns each annularly surround the outer wall of the guide tube 20c. Each of the coils 44c may thus generate an axially oriented magnetic field at the corresponding axial position inside the guide tube 20c, which magnetic field may enter into interaction with the piston 24c. By open-/closed-loop control of a current flowing through the coils 44c, it is possible, by means of interaction of the coil magnetic field generated as a consequence with the magnetic field of the permanent magnet body 54 (FIG. 6), to exert a force on the piston 24c in the axial direction of the guide tube 20c, in order to displace the piston 24c to aspirate or dispense the medium to be metered.

The coils 44c exhibit an axial coil length l and are arranged at distance s from one another. The distance s between adjacent coils 44c may conveniently be measured between axially central positions (at ½) of each coil 44c.

The distance s between adjacent coils 44c is preferably provided as a function of the axial length $L_m$ of the permanent magnet portions 56-1-56-5 and as a function of the phase control of the coils 44c. The magnetic field has a period of $2\times L_m$ in the axial direction, in accordance with the arrangement of the permanent magnet portions 56-1-56-5 with alternate directions of magnetisation (cf. FIG. 5). If displacement of the piston 24c is intended to proceed over this period length by sequentially driving a plurality of n axially successive coils 44c, this may be achieved by n-phase operation of the coils 44c, where the distance between adjacent coils 44c amounts to $$s=1/n\times 2\times L_m \quad (1).$$

According to this equation, a coil distance of $s=\frac{2}{3}\times L_m$ would thus be suitable for example for three-phase operation, while for four-phase operation the coil distance should amount to $s=\frac{1}{2}\times L_m$.

For particularly accurate or automated metering of the medium, the current flowing through the coils 44c may be adjusted as a function of a detected movement or position of the piston 24c. As is shown in FIG. 4, the coils 44c may for this purpose each be connected to a control device 45, which is in a position to control the current flowing through the coils 44c or the voltage applied in each case to the coils 44c. The control device 45 is part of a closed-loop control circuit and receives from a position detecting element 47 a detection value indicating the movement and/or the position of the piston 24c. The position detecting element 47 may extend along the guide tube 20c. In the exemplary embodiment according to FIG. 4, the position detecting element 47 is an optical detector, for example an optical line sensor (CCD line sensor, CMOS line sensor or the like) from a one-dimensional array of photodetectors extending along the guide tube 20c. The optical detection of the position or movement of the piston 24c has the advantage that only slight or absolutely no interference arises between position/movement detection and the magnetic piston control effected by the coils 44c.

In operation, the control device 45 is connected to a voltage source 50c and to an input unit 52c. The user may input a desired quantity to be metered via the input unit 52c (e.g. an electronic input unit, in particular a computer). The user input is sent to the control device 45, which calculates therefrom a setpoint position or setpoint movement for the piston 24c corresponding to the quantity to be metered. Depending on the detection value input from the position detecting element 47, the control device repeatedly determines during the metering process a deviation between the detected position or movement of the piston 24c and the setpoint movement or setpoint position of the piston 24c and controls the current intensity of the coils 44c as a function of the magnitude of this deviation. The control device 45 will in the process preferably control the coil currents in such a way that the force acting on the piston 24c is the greater, the greater is the control deviation between the detected piston movement/position and the setpoint movement/position of the piston.

A fourth exemplary embodiment of the invention is explained below with reference to FIG. 7. The fourth exemplary embodiment may be regarded as a variant of the third exemplary embodiment, such that hereinafter only the differences are examined and reference is explicitly made to the description of the third exemplary embodiment with regard to the elements of the pipette which are not described again.

A pipette 10d of the fourth exemplary embodiment comprises a guide tube 20d, in which a piston, not shown, is displaceably accommodated. To control the position or movement of the piston by means of magnetic interaction, a coil arrangement 42d with a plurality of coils 44-1d, 44-2d, 44-3d, 44-4d is arranged at the outer circumference of the guide tube 20d. Of the coils shown in the detail representation according to FIG. 7, the coils 44-1d and 44-2d are arranged at a first axial position of the guide tube 20d, while the coils 44-3d and 44-4d are arranged at a second (different) axial position of the guide tube 20d. Preferably, further coil pairs not shown in FIG. 7 are provided axially distributed over the guide tube 20d.

The coil 44-1d, which is described as a representative for all the coils 44-1d-44-4d, comprises a plurality of turns 60d, wherein each turn 60d is roughly rectangular in shape, the rectangle fitting closely against the cylindrical outer wall of the guide tube 20d. Each turn 60d accordingly comprises two turn portions 62d extending in the circumferential direction and two axial turn portions 64.

Multiple such rectangular turns 60d extend around one another or nested spirally in one another on the outer wall of the guide tube 20d. Furthermore, turns of this type may also be arranged in multiple layers on the outer surface of the guide tube 20d, as indicated in FIG. 7 at reference sign 66. The plurality of turns 60d arranged directly on the outside of the guide tube 20d, and optionally the additional turns arranged in the outer layers 66 are preferably wound from a single continuous wire, at the ends of which the coil current is fed in or dissipated, such that the coil 44-1d generates a magnetic field.

The axial length of the axial turn portions 64 is preferably selected such that the turn portions 62d connected together by the axial turn portions 64 and running circumferentially are at a distance s from one another in the axial direction, which distance may be selected in accordance with the distance s between axially adjacent coils described above in conjunction with the third exemplary embodiment of the invention, in particular as a function of a length $L_m$ of permanent magnet portions of a permanent magnet body of the piston. For instance, the average axial length s of the coil 44-1d, i.e. the average axial length of the axial turn portions 64, may be established in accordance with the above-stated equation (1).

In the exemplary embodiment, the circumferentially extending turn portions 62d are fashioned such that they do not completely surround the outer circumference of the guide tube 20d as a ring, but rather only extend over a circumferential angle of less than 360°, preferably less than 180° (cf. FIGS. 7 and 10). In the exemplary embodiment, the circumferential angle spanned by the circumferentially extending turn portions 62d is between approximately 80 and 120°. At a free circumferential portion 68d not covered by the coil 44-1d, the guide tube 20d may be accessible from outside, in order to allow visual monitoring of the metering process or to arrange a position detecting element to be described further below, without this being impeded by the coil 44-1d.

If the circumferentially running turn portions 62d extend over a circumferential angle of less than 180°, this means that the turns 60d of the coil 44-1d are arranged completely on one side of a longitudinal central plane E containing the longitudinal centre axis A of the guide tube 20d (FIG. 10). This allows arrangement of a second coil 44-2d symmetrical to the coil 44-1d at the same axial position as the first coil 44-1d. In the region of the section line between the longitudinal central plane E and the outer wall of the guide tube 20d the free circumferential portion 68d and a further, opposing free circumferential portion 70d then extend between the coils 44-1d, 44-2d.

In the exemplary embodiment, the turns 60d of the coils 44-1d and 44-2d are additionally arranged such that all the turns 60d of both coils 44-1d, 44-2d are located substantially between two tangential planes $T_1$, $T_2$, which lie tangentially against opposing outer sides (here in the region of the free circumferential portions 68d, 70d) of the guide tube 20d and are parallel to one another. Such an arrangement results in the additional advantage that a higher packing density may be achieved on joining together a plurality of guide tubes 20d than in a pipette in which the turns of the coils completely surround the guide tube. As is readily apparent from a comparison of FIGS. 9 and 10, in the case of the fourth exemplary embodiment according to FIG. 10 a width $y_1$ of the coils 44-1d, 44-2d in a direction orthogonal to the longitudinal centre axis A and parallel to the longitudinal central plane E is smaller than a corresponding width $y_2$ of coil 44c annularly surrounding the guide tube (e.g. the coil 44c of the third exemplary embodiment). In particular, a plurality of guide tubes 20d according to the fourth exemplary embodiment of the invention, joined together at their free circumferential portions 68d or 70d, could thus be so densely packed that the coils 44-1d to 44-4d do not substantially hamper the arrangements. A metering device with a plurality of guide tubes 20d may thus exhibit a more compact structure at least in one dimension.

FIG. 8 shows a fifth exemplary embodiment of the invention as a variant of the fourth exemplary embodiment of the invention, coils 44-1e, 44-2e of a coil arrangement 42e likewise not completely surrounding a guide tube 20e of a pipette 10e, in order to achieve the advantages and effects of accessibility of the guide tube 20e from outside and a higher packing density of multiple guide tubes 20e described in relation to the fourth exemplary embodiment.

Unlike in the fourth exemplary embodiment, however, in the fifth exemplary embodiment not all the turn portions of the turns 60e of the coils 44-1e, 44-2e extend on the outer wall of the guide tube 20e or parallel to the outer wall. Instead, one turn 60e of the fifth exemplary embodiment comprises turn portions 72 which extend from the outer wall of the guide tube 20e away from the guide tube 20e and are connected together again at a position remote from the guide tube 20e. The axial magnetic field inside the guide tube 20e is generated by circumferentially extending turn portions 62e, whose ends are connected to the turn portions 72 extending away from the guide tube 20e. As is apparent in FIG. 8, in the fifth exemplary embodiment the turns 60e extend in particular substantially in planes orthogonal to the longitudinal centre axis A.

In the fifth exemplary embodiment too, preferably two symmetrical coils 44-1e, 44-2e are attached on either side of a longitudinal central plane E of the guide tube 20e at the same axial position on the guide tube 20e, such that they jointly generate a relatively homogeneous axial magnetic field inside the guide tube 20e, comparable with the magnetic field of a coil with turns annularly surrounding the guide tube (e.g. according to FIG. 4).

In addition, in FIG. 8 a position detecting element 74, in particular a magnetic measuring system which allows axial detection of the magnetic field generated by a piston inserted into the guide tube 20e, is arranged on one of two opposing free circumferential portions 68e, 70e, at which the outer circumference of the guide tube 20e is not covered by turns 60e of the coils 44-1e, 44-2e. The position detecting element 74 may for example be a magnetisable strip, which extends axially at the free circumferential portion 68e and/or 70e and whose axial magnetisation profile may be read by a magnetic read unit in order to detect a position/movement of the piston.

The thus detected movement/position of the piston is fed back, preferably as a closed loop control signal, to a control device, which outputs an open-loop control signal on the basis of the closed-loop control signal, on the basis of which open-loop control signal the coils 44-1e, 44-2e are supplied with current of a given current intensity. The coils 44-1e, 44-2e, the control device and the position detecting element 74 then form essential components of a closed-loop control circuit for controlling the position or movement of the piston guided in the guide tube 20e and thus for precise, automatic control of a metering process of the pipette 10e.

While the free circumferential portions in the fourth and the fifth exemplary embodiments do indeed simplify the technical effort involved in attaching and operating a position detecting element, position detecting elements or other measures may also advantageously be provided to detect the position or movement of the piston in other exemplary embodiments of the invention, in particular in the above-described exemplary embodiments 1 to 3. For example, the position detecting element 74 of the fifth exemplary embodiment could also be used in pipettes in which the outer coils completely surround the guide tube, a magnetisable strip for instance being introduced between the outer wall of the guide tube and the turns of the coils. Corresponding correction of the detection signal of the position detecting element on the basis of the magnetic field generated by the coils is then necessary.

Other means known to a person skilled in the art for detecting the position/movement of the piston, for example optical detection or detection on the basis of other electromagnetic signals or acoustic signals, are likewise conceivable and are associated with the advantage that the electromagnetic or acoustic waves used to detect the position/movement of the piston do not interfere or interfere only slightly with the magnetic field of the coils or of the piston.

The invention claimed is:

1. A metering device, comprising
a guide tube,
a piston inserted displaceably in the guide tube,
an actuating arrangement for exerting a force on the piston in order to displace the piston in the guide tube, and
a chamber for accommodating a medium to be metered, the medium to be metered being aspiratable or dispensable in accordance with displacement of the piston,
wherein the actuating arrangement is designed for magnetic interaction with the piston,
the metering device comprising a control device for controlling the size and/or position and/or direction of the magnetic field, the control device being designed to control the piston position by feedback of a detection value indicating the movement
or position of the piston.

2. A metering device according to claim 1, wherein a position detector or a balance detecting the quantity of aspirated or dispensed medium, the position detector or the balance providing the detection value indicating the movement or the position of the piston for closed-loop control of the piston position detector.

3. A metering device, comprising
a guide tube,
a piston inserted displaceably into the guide tube,
an actuating arrangement for exerting a force on the piston, in order to displace the piston in the guide tube, and
a chamber for accommodating a medium to be metered, said chamber having a nozzle opening, the medium to be metered being aspiratable and dispensable through said nozzle opening in accordance with displacement of the piston, wherein the actuating arrangement comprise a magnetic field generating means for generating a magnetic field, and the magnetic field generating means comprises a coil arrangement with at least one coil, whose turns coaxially surround the guide tube,
wherein the piston comprises at least two mutually adjacent permanent magnet portions, the magnetisations of which extend axially relative to the guide tube, the magnetisations of mutually adjacent permanent magnet portions being directed in opposite directions relative to one another.

4. A metering device according to claim 3, wherein the permanent magnet portions are formed by permanent magnets, which are fastened together such that magnetic north poles of adjacent permanent magnets are arranged facing one another and adjacent one another or that magnetic south poles of adjacent permanent magnets are arranged facing one another and adjacent one another.

5. A metering device according to claim 1, wherein the actuating arrangement comprises a magnetic field generating means for generating a magnetic field.

6. A metering device according to claim 1, wherein the piston is formed at least in part of a magnetisable material.

7. A metering device according to claim 5, wherein the magnetic field generating means is designed to generate a magnetic field whose magnetic flux passes through the piston substantially axially to the guide tube.

8. A metering device according to claim 1, wherein the actuating arrangement is designed to generate a magnetic field movable substantially in the axial direction of the guide tube.

9. A metering device according to claim 5, wherein the magnetic field generating means comprises an annular permanent magnet, which coaxially surrounds the guide tube.

10. A metering device according to claim 5, wherein the magnetic field generating means comprises a coil arrangement with at least one coil, whose turns coaxially surround the guide tube.

11. A metering device according to claim 5, wherein the magnetic field generating means comprises a coil arrangement with a plurality of coils, whose turns each coaxially surround the guide tube, the coils being offset axially relative to one another.

12. A metering device according to claim 1, wherein the actuating arrangement comprises a magnetic field generating means for generating a magnetic field, the magnetic field generating means comprising a coil arrangement with at least one coil, which comprises at least one turn, the at least one turn surrounding only a part of the circumference of the guide tube.

13. A metering device according to claim 1, wherein the actuating arrangement comprises a magnetic field generating means for generating a magnetic field, the magnetic field generating means comprising a coil arrangement with at least one coil, which comprises at least one turn, the at least one turn extending completely on one side of a longitudinal central plane containing a longitudinal centre axis of the guide tube.

14. A metering device according to claim 12, wherein the at least one turn extends completely between two mutually parallel tangential planes of the guide tube touching the outer wall of the guide tube.

15. A metering device according to claim 13, wherein the coil arrangement comprises a first coil with at least one first turn and a second coil with at least one second turn, the at least one first turn extending completely on one side of the longitudinal central plane and the at least one second turns extending completely on the other side of the longitudinal central plane.

16. A metering device according to claim 12, wherein the at least one turn comprises a turn portion which extends in the circumferential direction along an outer wall of the guide tube.

17. A metering device according to claim 12, wherein the at least one turn comprises a turn portion which extends in the axial direction along an outer wall of the guide tube.

18. A metering device according to claim 17, wherein an axial length of the axially extending turn portion is adapted to a length of the permanent magnet portion or of the permanent ma ret.

19. A metering device according to claim 12, wherein the at least one turn comprises a turn portion, which extends towards the guide tube, then along the guide tube and then away from the guide tube.

20. A metering device according to claim 12, wherein a position detecting element of a position detector is arranged at the part of the circumference of the guide tube not surrounded by the at least one turn, the position detector detecting by means of the position detecting element a detection value indicating the movement or the position of the piston.

21. A metering device according to claim 20, wherein the position detecting element is designed for magnetic interaction with the piston.

22. A metering device according to claim 1, wherein a control device for controlling the size and/or position and/or direction of the magnetic field.

23. A metering method for metering a medium using the metering device according to claim 1, the metering device comprising a guide tube, a piston inserted displaceably in the guide tube and a chamber for accommodating the medium to be metered, the medium to be metered being aspirated or dispensed in accordance with displacement of the piston, including the steps of:
   providing a magnetic field and
   exerting a force on the piston by magnetic interaction of the piston with the magnetic field.

24. A metering method according to claim 23, wherein the metering device comprises a coil arrangement with a plurality of coils whose turns in each case coaxially surround or partially surround the guide tube, the coils being offset axially relative to one another and the current intensities supplied in each case to the coils being controlled in accordance with a dose to be aspirated or dispensed.

\* \* \* \* \*